(12) United States Patent
Song et al.

(10) Patent No.: US 11,778,139 B2
(45) Date of Patent: *Oct. 3, 2023

(54) ELECTRONIC APPARATUS AND CONTROL METHOD THEREOF

(71) Applicant: SAMSUNG ELECTRONICS CO., LTD., Suwon-si (KR)

(72) Inventors: Wonseok Song, Suwon-si (KR); Yoosun Jung, Suwon-si (KR); Shinhaeng Kim, Suwon-si (KR); Sangsu Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/910,275

(22) Filed: Jun. 24, 2020

(65) Prior Publication Data
US 2021/0168329 A1 Jun. 3, 2021

Related U.S. Application Data

(63) Continuation of application No. 16/838,554, filed on Apr. 2, 2020, now Pat. No. 11,233,970.

(30) Foreign Application Priority Data

Nov. 28, 2019 (KR) .......................... 10-2019-0156091

(51) Int. Cl.
*H04N 7/01* (2006.01)
(52) U.S. Cl.
CPC ......... *H04N 7/0127* (2013.01); *H04N 7/0115* (2013.01); *H04N 7/0135* (2013.01)

(58) Field of Classification Search
CPC .. H04N 7/0127; H04N 7/0115; H04N 7/0135; G06T 2207/20221;
(Continued)

(56) References Cited

U.S. PATENT DOCUMENTS 6,538,688 B1 * 3/2003 Giles ................... H04N 7/0112
348/E7.015
8,374,240 B1 * 2/2013 Namboodiri ........... H04N 19/50
375/240.12
(Continued)

FOREIGN PATENT DOCUMENTS

| CN | 101411204 A | 4/2009 |
| CN | 103108148 A | 5/2013 |

(Continued)

OTHER PUBLICATIONS

U.S. Appl. No. 16/838,554, filed Apr. 2, 2020; Song et al.
(Continued)

*Primary Examiner* — Michael Lee
(74) *Attorney, Agent, or Firm* — Nixon & Vanderhye P.C.

(57) ABSTRACT

Disclosed is an electronic apparatus. The electronic apparatus includes a memory configured to store a plurality of frames included in an input image and a processor configured to: identify whether one frame of the plurality of frames is a first interpolated frame generated based on at least two frames from remaining frames of the plurality of frames, and select a reference frame to be used in frame interpolation of the plurality of frames based on the first interpolated frame being identified.

18 Claims, 14 Drawing Sheets

(58) Field of Classification Search
CPC . G06T 2207/10016; G06T 2207/20216; G06T 5/50
USPC .......................................................... 348/441
See application file for complete search history.

(56) References Cited

U.S. PATENT DOCUMENTS

| | | | |
|---|---|---|---|
| 8,537,901 | B2 | 9/2013 | Deng et al. |
| 8,692,935 | B1 | 4/2014 | Namboodiri |
| 8,842,742 | B2 | 9/2014 | Cordes et al. |
| 9,602,762 | B2 | 3/2017 | Chen et al. |
| 10,382,718 | B2 | 8/2019 | Lee et al. |
| 2004/0227851 | A1* | 11/2004 | Min ................ H04N 5/145 348/E7.013 |
| 2008/0151109 | A1* | 6/2008 | Doswald ............ H04N 7/0115 348/459 |
| 2008/0170161 | A1* | 7/2008 | Ogino ................ H04N 5/144 348/E5.062 |
| 2009/0161009 | A1* | 6/2009 | Glen ................. H04N 7/0127 348/441 |
| 2009/0161017 | A1* | 6/2009 | Glen ................. H04N 19/61 348/624 |
| 2009/0208123 | A1* | 8/2009 | Doswald ............ H04N 19/587 382/236 |
| 2010/0033630 | A1* | 2/2010 | Liang ................ H04N 7/0115 375/E7.76 |
| 2013/0051471 | A1* | 2/2013 | Ahn ................. H04N 19/139 375/E7.125 |
| 2014/0205268 | A1 | 7/2014 | Lin |
| 2014/0226901 | A1* | 8/2014 | Spracklen ............ G06F 3/1454 382/167 |
| 2015/0341592 | A1 | 11/2015 | Chen et al. |
| 2015/0350496 | A1 | 12/2015 | Iyer et al. |
| 2016/0182911 | A1 | 6/2016 | Su et al. |
| 2016/0301881 | A1* | 10/2016 | Taggart ................. G06T 7/207 |
| 2016/0371816 | A1 | 12/2016 | Choudhury et al. |
| 2017/0178295 | A1 | 6/2017 | Diggins |
| 2019/0199961 | A1 | 6/2019 | Lee et al. |

FOREIGN PATENT DOCUMENTS

| | | |
|---|---|---|
| JP | 2011-078136 | 4/2011 |
| JP | 2019-176246 A | 10/2019 |
| KR | 10-1852967 B1 | 6/2018 |

OTHER PUBLICATIONS

European Extended Search Report dated Aug. 7, 2020 for EP Application No. 20166795.3.
PCT International Search Report dated Aug. 24, 2020 for PCT/KR2020/004983 (3pgs).
PCT Written Opinion dated Aug. 24, 2020 for PCT/KR2020/004983 (6pgs).
European Examination Report dated Apr. 5, 2022 for EP Application No. 20166795.3.
Chinese Office Action dated Oct. 10, 2022 for CN Application No. 202010484689.5.
Chinese Office Action dated May 11, 2023 for CN Application No. 202010484689.5.

* cited by examiner

ELECTRONIC APPARATUS AND CONTROL METHOD THEREOF

CROSS-REFERENCE TO RELATED APPLICATION

This application is a continuation of application Ser. No. 16/838,554, filed Apr. 2, 2020, which claims priority to Korean Patent Application No. 10-2019-0156091, filed on Nov. 28, 2019, the entire contents of each of which are all hereby incorporated herein by reference in their entireties.

BACKGROUND

1. Field

The disclosure relates to an electronic apparatus and a control method thereof, and for example, to an electronic apparatus that improves image quality and a control method thereof.

2. Description of Related Art

Recently, technologies such as generating high quality image or converting images generated in low quality to high quality are being developed with rapid development in technology.

In particular, among the technologies of converting an image generated in low quality to high quality, a leading method may be the method of improving frame rate through frame interpolation. For example, a 24 fps motion picture may be improved in frame rate to 60 fps through frame interpolation. For a frame interpolation method, a method of repeating a specific frame or a temporal averaging method may be used. The method of repeating a specific frame may be a method of copying and adding a specific frame as an interpolated frame, and a temporal averaging method may be a method of generating interpolated frame by averaging a plurality of frames and adding the generated interpolated frame. The above will be described in greater detail through FIGS. 1A, 1B and 1C.

FIGS. 1A, 1B and 1C are diagrams illustrating a method of improving frame rate according to conventional technology. FIG. 1A illustrates two frames for convenience of description, but the actual number of frames may be more. Further, FIGS. 1A, 1B and 1C are provided assuming an interpolation method of adding one frame per every two frames.

As illustrated in FIG. 1A, based on one frame having passed, a circular object on the left side of the image may be shifted to the right side.

Based on performing interpolation of a specific frame through a repetition method, a left side frame may be copied and added between the two frames, as illustrated in FIG. 1B. In addition, based on performing interpolation through a temporal averaging method, the interpolated frame formed of an average value of pixel values in a corresponding position in two frames may be added between the two frames as illustrated in FIG. 1C. However, as in FIGS. 1B and 1C, based on outputting an image after performing frame interpolation, the movement of the object may be changed nonlinearly. For example, the position of the object in the image moving at a certain speed may be changed nonlinearly through interpolation as in FIGS. 1B and 1C and motion judder may be generated.

For example, the interpolation method such as in FIGS. 1B and 1C has been be used in cases such as broadcasting companies transmitting images, and electronic apparatuses such as a TV and the like have cancelled motion judder by detecting repeating frames as in FIG. 1B, and performing interpolation again.

For example, the electronic apparatus may identify whether each frame is iterated twice in an image converted from 30 fps to 60 fps (30 fps→60 fps), and identify whether there are two pieces of same frames once in every six frames in an image converted from 50 fps to 60 fps (50 fps→60 fps). That is, the electronic apparatus may identify whether two generally adjacent frames are identical to identify whether frame repetition has occurred, and remove an interpolated frame by removing one of two identical frames.

However, conventional electronic apparatuses are incapable of identifying interpolated frames by a temporal averaging method as in FIG. 1C, and there are still disadvantages such as motion judder being generated.

SUMMARY

Embodiments of the disclosure provide an electronic apparatus for improving image quality by removing and/or reducing a motion judder of an image and a control method thereof.

According to an example embodiment of the disclosure, an electronic apparatus includes: a memory configured to store a plurality of frames included in an input image and a processor configured to: identify whether one frame of the plurality of frames is a first interpolated frame generated based on at least two frames from remaining frames of the plurality of frames, and select a reference frame to be used in frame interpolation of the plurality of frames based on identifying the first interpolated frame.

The processor may be further configured to identify a plurality of original frames of the plurality of frames based on the first interpolated frame, and obtain an output image by selecting the plurality of original frames as the reference frame and performing frame interpolation.

The processor may be further configured to identify a frame rate of an original image corresponding to the input image based on the first interpolated frame, and perform the frame interpolation based on the frame rate of the original image and the reference frame.

The processor may be further configured to identify whether a first frame of the plurality of frames is a first interpolated frame generated based on a second frame, the second frame being a frame directly before the first frame, and a third frame, the third frame being a frame directly after the first frame.

The processor may be further configured to obtain an assembled frame by assembling the second frame and the third frame, and identify whether the first frame is the first interpolated frame based on a similarity between the assembled frame and the first frame.

The processor may be further configured to obtain the assembled frame based on one of an average of the second frame and the third frame and a weighted sum of the second frame and the third frame.

The processor may be further configured to identify the first frame as the first interpolated frame based on a sum of absolute difference (SAD) value or a sum of squared difference (SSD) value between the assembled frame and the first frame being less than a threshold value.

The processor may be further configured to identify whether the first frame is the first interpolated frame based on a first sum of absolute difference (SAD) value between the first frame and the second frame, a second SAD value between the first frame and the third frame, and a third SAD value between the second frame and the third frame.

The processor may be further configured to identify whether one frame of a plurality of frames is a second interpolated frame inserted by repeating another frame from the plurality of frames, and identify the reference frame of the plurality of frames based on at least one of the first interpolated frame or the second interpolated frame.

The processor may be further configured to identify a frame rate of an original image corresponding to the input image based on the first interpolated frame; obtain information on timing of frame interpolation based on a frame rate of the original image and an output frame rate; and perform the frame interpolation based on information on the timing of frame interpolation.

The processor may be further configured to obtain motion information from the reference frame based on information on the timing of frame interpolation, and perform the frame interpolation based on the obtained motion information.

The apparatus may further include a display, wherein the processor is configured to control the display to display the output image.

According to an example embodiment, a method of controlling an electronic apparatus includes identifying whether one frame of a plurality of frames included in an input image is a first interpolated frame generated based on at least two frames from remaining frames of the plurality of frames and selecting a reference frame to be used in frame interpolation of the plurality of frames based on identifying the first interpolated frame.

The selecting may include identifying a plurality of original frames of the plurality of frames based on the first interpolated frame, and the method further comprises obtaining an output image by selecting the plurality of original frames as the references frames and obtaining an output image by performing frame interpolation.

The method may further include identifying a frame rate of an original image corresponding to the input image based on the first interpolated frame, and wherein the obtaining the output image comprises performing the frame interpolation based on a frame rate of the original image and the reference frame.

The identifying may include identifying whether a first frame of the plurality of frames is a first interpolated frame generated based on a second frame, is the second frame being a frame directly before the first frame, and a third frame, the third frame being a frame directly after the first frame.

The identifying may include obtaining an assembled frame by assembling the second frame and the third frame, and identifying whether the first frame is the first interpolated frame based on a similarity between the assembled frame and the first frame.

The obtaining the assembled frame may include obtaining the assembled frame based on one of an average between the second frame and the third frame and a weighted sum of the second frame and the third frame.

The identifying may include identifying the first frame as the first interpolated frame based on a sum of absolute difference (SAD) value or a sum of squared difference (SSD) value between the assembled frame and the first frame being less than a threshold value.

The identifying may include identifying whether the first frame is the first interpolated frame based on a first sum or absolute different (SAD) value between the first frame and the second frame, a second SAD value between the first frame and the third frame, and a third SAD value between the second frame and the third frame.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1A:
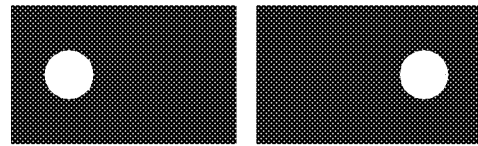
FIG. 1A is a diagram illustrating a method of improving frame rate according to conventional technology.

The various example embodiments of the present disclosure may be diversely modified. Accordingly, various example embodiments are illustrated in the drawings and are described in detail in the detailed description. However, it is to be understood that the present disclosure is not limited to a specific example embodiment, but includes all modifications, equivalents, and substitutions without departing from the scope and spirit of the present disclosure. Also, well-known functions or constructions may not be described in detail where they may obscure the disclosure with unnecessary detail.

The disclosure will be described in greater detail below with reference to accompanying drawings.

The example embodiments of the disclosure are based on the above-described necessity, and embodiments of the disclosure provide an electronic apparatus for improving image quality by removing a motion judder of an image and a control method thereof.

The terms used in describing the various example embodiments of the disclosure are general terms selected that are currently widely used considering their function herein. However, the terms may change depending on intention, legal or technical interpretation, emergence of new technologies, and the like of those skilled in the related art. Further, in certain cases, there may be terms arbitrarily selected, and this case, the meaning of the term will be disclosed in greater detail in the corresponding description. Accordingly, the terms used herein are not to be understood simply as its designation but based on the meaning of the term and the overall context of the disclosure.

Expressions such as "comprise", "may comprise", "consist", or "may consist of" used herein are to be understood as designating a presence of a characteristic (e.g., elements such as a number, a function, an operation, and a component), and do not exclude the presence of an additional characteristic.

The expression at least one of A and/or B should be understood to represent "A" or "B" or any one of "A and B".

Expressions such as "first", "second", and so on used herein may be used to refer to various elements regardless of order and/or importance. Further, it should be noted that the expressions are merely used to distinguish an element from another element and not to limit the relevant elements.

A singular expression includes a plural expression, unless otherwise specified. It is to be understood that the terms such as "comprise" or "consist of" are used herein to designate a presence of a characteristic, number, step, operation, element, component, or a combination thereof, and not to preclude a presence or a possibility of adding one or more of other characteristics, numbers, steps, operations, elements, components or a combination thereof.

In the disclosure, the term user may refer to a person using an electronic apparatus or an apparatus (e.g., artificial intelligence electronic apparatus) using an electronic apparatus.

Embodiments of the disclosure will be described in greater detail below with reference to the drawings.

Figure 2:
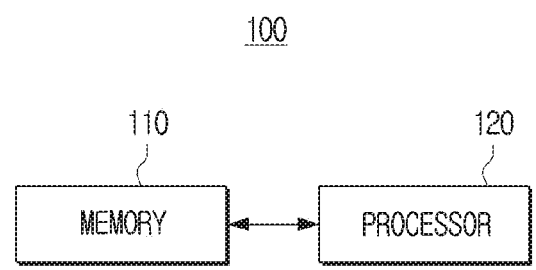
FIG. 2 is a block diagram illustrating an example configuration of an example electronic apparatus according to an embodiment of the disclosure.

FIG. 2 is a block diagram illustrating an example configuration of an example electronic apparatus 100 according to an embodiment of the disclosure. However, the disclosure is not limited thereto, and the electronic apparatus 100 may be implemented with some parts of the configuration of FIG. 2 omitted and/or other parts added.

The electronic apparatus 100 may be an apparatus that performs image processing on an input image. For example, the electronic apparatus 100 may remove an interpolated frame by any one of a frame repetition method or temporal averaging method in an input image. Further, the electronic apparatus 100 may add an interpolated frame through a method different from the above-described methods in an image with an interpolated framed removed.

The electronic apparatus 100 may include, for example, and without limitation, a display such as a TV, desktop PC, notebook, smartphone, tablet PC, digital camera, MP3 player, PMP, cellular phone, smart glasses, smart watch, navigation, or the like and may be an electronic apparatus that directly displays the image processing results on the input image.

In addition, the electronic apparatus 100 may be an apparatus that provides image processing results on an input image to an external display apparatus such as, for example, and without limitation, a set-top box (STB), a server, a Blu-ray disc (BD) player, disc player, a streaming box, etc. However, the apparatus is not limited thereto, and the electronic apparatus 100 may be any apparatus that is capable of performing image processing on an input image.

Referring to FIG. 2, the electronic apparatus 100 may include a memory 110 and a processor (e.g., including processing circuitry) 120.

The memory 110 may store a plurality of frames of an input image. For example, based on the input image being streamed from another electronic apparatus, the memory 110 may consecutively store the plurality of frames of the input image being streamed. All of an input image may be stored in the memory 110. In this example, all frames that comprise the input image may be stored in the memory 110.

The memory 110 may be implemented as a non-volatile memory and a volatile memory, but is not limited thereto. For example, a hard disk may be used in place of the memory 110, and any configuration may be possible if the configuration is capable of storing data.

The processor 120 may include various processing circuitry and control the overall operation of the electronic apparatus 100. The processor 120 may be connected to each configuration of the electronic apparatus 100 and control the overall operation of the electronic apparatus 100. For example, the processor 120 may be connected to configurations such as the memory 110, a display (not shown), a communication interface (not shown) and the like, and control the operation of the electronic apparatus 100.

According to an embodiment, the processor 120 may be implemented, for example, and without limitation, as a digital signal processor (DSP), a microprocessor, a time controller (TCON), or the like, but is not limited thereto. The processor 120 may include, for example, and without limitation, one or more of a central processing unit (CPU), a dedicated processor, a micro controller unit (MCU), a micro processing unit (MPU), a controller, an application processor (AP), a communication processor (CP), an ARM processor, or the like, or may be defined by the corresponding term. In addition, the processor 120 may be implemented as a System on Chip (SOC) or a large scale integration (LSI) embedded with a processing algorithm, and as a form of field programmable gate array (FPGA).

The processor 120 may identify whether one frame of a plurality of frames is a first interpolated frame generated based on at least two frames from the remaining frames of the plurality of frames. For example, the processor 120 may identify whether one frame of the plurality of frames is a temporal average of two frames from the remaining frames of the plurality of frames.

For example, the processor 120 may identify whether a first frame of a plurality of frames is a first interpolated frame based on a second frame directly before the first frame and a third frame directly after the first frame. The processor 120 may identify whether the interpolated frame based on an average value of pixel values corresponding to the second frame and the third frame is similar to the first frame. The processor 120 may identify that the first frame is a first interpolated frame based on identifying the interpolated frame as being similar to the first frame.

The processor 120 may assemble the second frame and the third frame to obtain an assembled frame, and may identify whether the first frame is a first interpolated frame based on a similarity between the assembled frame and the first frame.

The processor 120 may obtain an assembled frame based on one of an average and a weighted sum between the second frame and the third frame. For example, the processor 120 may obtain a weighted sum of the second frame and the third frame with the weighted value of (05, 05). However, the processor is not limited thereto, and the processor 120 may obtain an assembled frame using any of the various weighted values such as (0.1, 0.9), . . . , (0.4, 0.6), . . . , and (0.9, 0.1).

The processor 120 may identify the first frame as the first interpolated frame based on a value of sum of absolute difference (SAD) and a value of sum of squared difference (SSD) between the assembled frame and the first frame being less than a threshold value. The processor 120 may obtain the SAD value and the SSD value with methods such as Equation 1 and Equation 2.

$$SAD = \Sigma_i |f_n(i) - f_{n-1}(i)| \quad \text{[Equation 1]}$$

$$SSD = \rho_i (f_n(i) - f_{n-1}(i))^2 \quad \text{[Equation 2]}$$

Here, fn represents a first frame, fn-1 represents an assembled frame, and i represents one of a plurality of pixels.

The threshold value may be a predetermined value. The threshold value may, for example, and without limitation, be any one of a minimum value, a maximum value, an average value, a median value, or a weighted sum during a certain time interval. For example, the processor 120 may obtain a SAD value or a SSD value by comparing a plurality of frames consecutively with the directly before frame and directly after frame. Further, the processor 120 may use one of a minimum value, a maximum value, an average value, a median value and a weighted sum of the previously obtained SAD values or SSD values to identify whether the first frame is a first interpolated frame. For example, the processor 120 may, in order to identify whether a first frame is a first interpolated frame using a SAD value, obtain an average value of the five previously obtained SAD values of the first frame as a threshold value and identify whether the SAD value of the assembled frame obtained from the second frame and the third frame and the first frame is less than the threshold value. The processor 120 may adaptively identify the first interpolated frame based on using the SAD values during a certain time interval or the threshold value of one of a minimum value, a maximum value, an average value, a median value, and a weighted sum of the SSD values.

In addition, processor 120 may identify whether the first frame is a first interpolated frame based on the first SAD value between the first frame and the second frame, the second SAD value between the first frame and the third frame, and the third SAD value between the second frame and the third frame. For example, the processor 120 may identify whether the first frame is a first interpolated frame with a method such as Equation 3 below.

$$|SAD_{02} - (SAD_{01} + SAD_{12})| < SAD_{th} \quad \text{[Equation 3]}$$

Here, $SAD_{01}$ represents a second SAD value, $SAD_{02}$ represents a third SAD value, $SAD_{12}$ represents a first SAD value, and SADth represents a threshold SAD value. The threshold SAD value may be a predetermined value. The threshold SAD value may, for example, and without limitation, be one of a minimum value, a maximum value, an average value, a median value and a weighted sum of previously obtained SAD values. In this example, the processor 120 may adaptively identify the first interpolated frame through the operations above.

Although it has been described above that three frames have been compared to identify a first interpolated frame, the disclosure is not limited thereto. For example, the processor 120 may obtain an assembled frame from three or more frames, and compare similarity with one frame. In addition, the processor 120 may identify the first interpolated frame by comparing non-consecutive frames.

The processor 120 may select a reference frame to be used in frame interpolation from a plurality of frames based on identification of the first interpolated frame.

The processor 120 may identify a plurality of original frames from the plurality of iframes based on the first interpolated frame, and may obtain an output image by selecting the plurality of original frames as reference frames and performing frame interpolation. For example, the processor 120 may identify a plurality of original frames by removing the first interpolated frames identified from the plurality of frames. The processor 120 may then obtain an output image by selecting all of the plurality of original frames as reference frames and performing frame interpolation. The processor 120 may obtain an output image by selecting some of the plurality of original frames as reference frames and performing frame interpolation. For example, the plurality of original frames may be frames with interpolated frames removed from the plurality of frames, and the reference frame may be a frame for performing frame interpolation and may be some or all of the plurality of original frames. Further, the processor 120 may determine the original frames close to timing of frame interpolation as reference frames. For example, based on the frame numbers of the original frame being 1, 2, 3, . . . , and n and performing interpolation of frame number 1.5, the processor 120 may select frame number 1 and 2 of the original frames as references frames. However, the processor is not limited thereto, and the processor 120 may use any of the original frames having different frame numbers as reference frames.

The processor 120 may identify a frame rate of the original image that corresponds to the input image based on the first interpolated frame, and perform frame interpolation based on the frame rate and reference frame of the original image. For example, the processor 120 may, based on identifying one frame of two consecutive frames from a plurality of frames as the first interpolated frame, identify one-half value of the current frame rate as the frame rate of the original image, and perform frame interpolation based on the frame rate and the reference frame of the original image. In this example, the processor 120 may, after identifying the frame rate of the original image, reduce power consumption as an operation to identify the first interpolated frame may not be performed.

The processor 120 may identify the frame rate of the original image corresponding to the input image based on the first interpolated frame, obtain information on timing of frame interpolation based on the frame rate and output frame rate of the original image, and perform frame interpolation based on information on timing of frame interpolation. For example, the processor 120 may, based on the frame rate of the original image being 30 fps and the frame number being 1, 2, 3, 4, . . . , and n and the output frame rate being 60 fps, obtain information on timing of frame interpolation of frame numbers 1, 1.5, 2, 2.5, 3, 3.5, . . . , n, and n+0.5 and perform frame interpolation based on information on timing of frame interpolation. In this example, since the frame numbers 1, 2, . . . , and n may use the existing frames, the processor 120 may generate interpolated frames of 1.5, 2.5, . . . , and n+0.5 timing.

The processor 120 may obtain motion information from a reference frame based on information on timing of frame interpolation, and perform frame interpolation based on the obtained motion information. For example, rather than performing interpolation by a repetition method or a temporal averaging method of a specific frame, the processor 120 may perform frame interpolation without generating motion judder by performing frame interpolation reflecting motion information of an object included in the original frame. That is, the processor 120 may perform frame interpolation with methods such as motion estimation and compensation, and optical flow, and may express movement of an object included in the frame more smoothly based on using the methods.

The processor 120 may identify whether one frame of a plurality of frames is a second interpolated frame inserted by repeating another frame from the plurality of frames. For example, the processor 120 may identify whether the SAD value or the SSD value of the first frame and the second frame directly before the first frame is less than the threshold value, and identify the first frame as the second interpolated frame based on the SAD value or the SSD value being less than the threshold value. The threshold value may, for example, and without limitation, be one of a minimum value, a maximum value, an average value, a median value or a weighted sum of a predetermined value or during a certain time interval.

The processor 120 may identify a reference frame from a plurality of frames based on at least one of the first interpolated frame or the second interpolated frame. For example, the processor 120 may not only perform an operation identifying the first interpolated frame with the temporal averaging method, but also further identify the second interpolated frame with the method of repeating a certain frame, and identify the reference frame from the plurality of frames based on at least one of the first interpolated frame or the second interpolated frame.

The electronic apparatus 100 may further include a display (not shown), and the processor 120 may control the display to display an output image.

The display may be implemented as various types of display such as, for example, and without limitation, a liquid crystal display (LCD), an organic light emitting diode (OLED) display, a plasma display panel (PDP), or the like. In the display, a driving circuit and a backlight unit, which may be implemented in the form of an a-si thin film transistor (TFT), a low temperature poly silicon (LTPS) TFT, an organic TFT (OTFT), and the like, may also be included. The display may be implemented as a touch screen coupled with a touch sensor, a flexible display, a three dimensional display (3D display), or the like.

The electronic apparatus 100 may further include a communication interface (not shown).

The communication interface may include various communication circuitry and be configured to perform communication with various types of external apparatuses according to the various types of communication methods. The communication interface may include various modules including various communication circuitry, such as, for example, and without limitation, a Wi-Fi module, a Bluetooth module, an infrared communication module, a wireless communication module, and the like. The each of the communication module may be implemented in at least one hardware chip type.

The processor 120 may use the communication interface to receive input images from various external apparatuses. The external apparatus may include, for example, and without limitation, a server, a Bluetooth earphone, a display apparatus, and the like.

The Wi-Fi module and the Bluetooth module may perform communication using Wi-Fi method and Bluetooth method, respectively. Based on using the Wi-Fi module or the Bluetooth module, various connection information such as a service set identifier (SSID) and a session key may be transmitted and received first, and after establishing communication connectivity using the same, various information may be transmitted and received.

The infrared ray communication module may perform communication according to infrared data association (IrDA) technology that transmits data wirelessly at a close range using an infrared ray between visible rays and millimeter waves.

The wireless communication module may include at least one communication chip performing communication according to various communication standards such as Zig-Bee, $3^{rd}$ generation (3G), $3^{rd}$ generation partnership project (3GPP), long term evolution (LTE), LTE advanced (LTE-A), $4^{th}$ generation (4G), and $5^{th}$ generation (5G), in addition to the communication methods described above.

Other communication interfaces may include, for example, and without limitation, at least one of a wired communication module performing communication using a local area network (LAN) module, Ethernet module, a pair cable, a coaxial cable, an optical cable, or the like.

The communication interface may further include an input and output interface. The input and output interface may include various interface circuitry and may, for example, and without limitation, be any one interface of the high-definition multimedia interface (HDMI), mobile high-definition link (MHL), universal serial bus (USB), display port (DP), Thunderbolt, video graphics array (VGA) port, RGB port, D-subminiature (D-SUB), digital visual interface (DVI), and the like The input and output interface may input and output at least one of an audio signal and a video signal.

According to an embodiment, the input and output interface may include a port for inputting and outputting only the audio signal and a separate port for inputting and outputting only the video signal, or may be implemented as one port for inputting and outputting both the audio signal and the video signal.

As described above, the electronic apparatus may identify an interpolated frame inserted through the temporal averaging method in the plurality of frames included in the input image, and obtain an output image with motion judder cancelled by performing frame interpolation of a plurality of original frames based on the identified interpolated frame.

The operations of the processor 120 will be described in greater detail below with reference to the various drawings.

Figure 3:
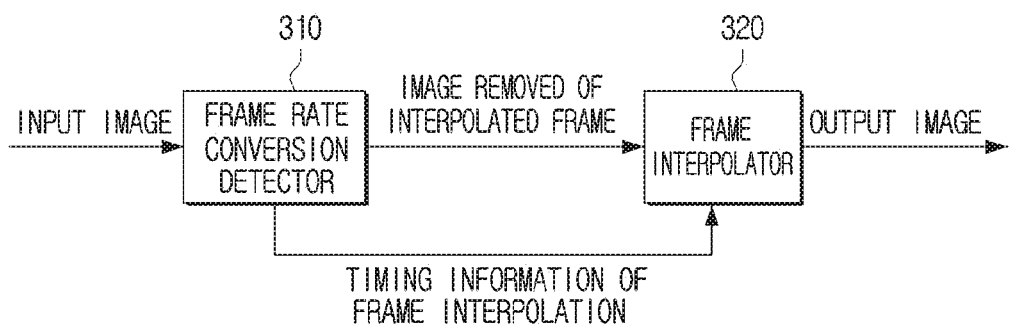
FIG. 3 is a diagram illustrating example operation of an electronic apparatus according to an embodiment of the disclosure.

FIG. 3 is a diagram illustrating example operation of an electronic apparatus according to an embodiment of the disclosure.

As illustrated in FIG. 3, the electronic apparatus 100 may include a frame rate conversion detector (e.g., including frame rate conversion detecting circuitry) 310 and a frame interpolator (e.g., including frame interpolating circuitry) 320. The frame rate conversion detector 310 and the frame interpolator 320 may be implemented as a hardware as one configuration within the processor 120, respectively, or as a software module, or a combination thereof, so that the processor 120 may operate according to the software module.

The frame rate conversion detector 310 may include various frame rate conversion detecting circuitry and/or executable program elements and provide an image including a plurality of original frames with interpolated frames removed from the input image to the frame interpolator 320 based on the input image being input. In addition, the frame rate conversion detector 310 may provide timing information of frame interpolation to the frame interpolator 320.

For convenience of description, the operation of the frame rate conversion detector 310 will be described in greater detail below with reference to FIG. 4.

Figure 4:
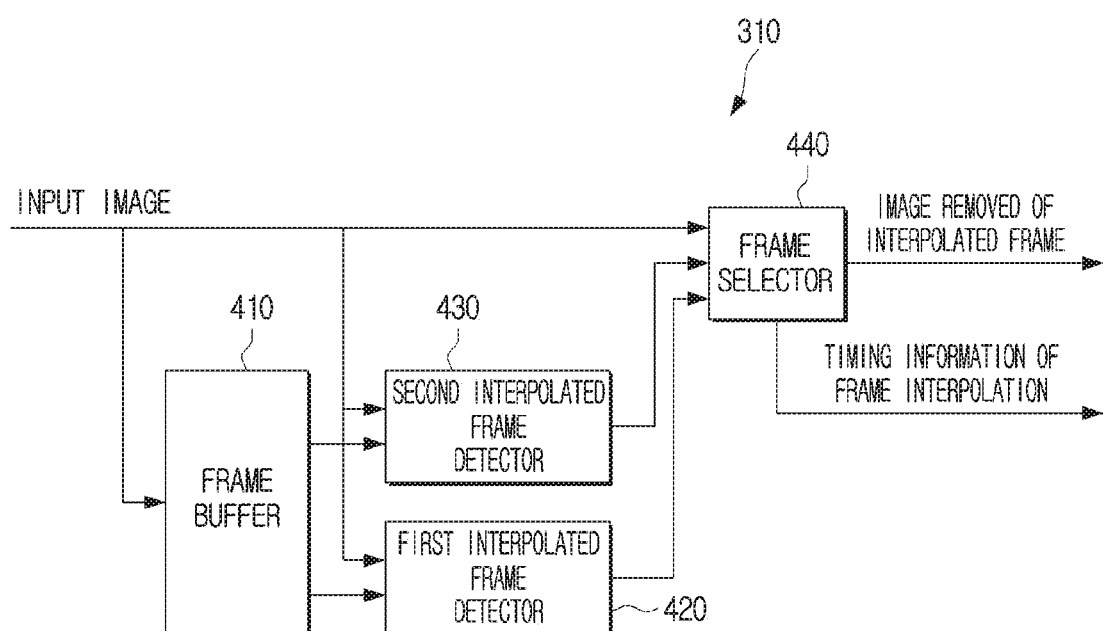
FIG. 4 is a diagram illustrating an example operation of a frame rate conversion detector according to an embodiment of the disclosure.

FIG. 4 is a diagram illustrating an example operation of a frame rate conversion detector 310 according to an embodiment of the disclosure.

The frame rate conversion detector 310 may include a frame buffer 410, a first interpolated frame detector (e.g., including interpolated frame detecting circuitry) 420, a second interpolated frame detector (e.g., including interpolated frame detecting circuitry) 430, and a frame selector (e.g., including frame detecting circuitry) 440. As described in FIG. 3, each configuration of the frame rate conversion detector 310 may be implemented as a hardware as one configuration within the processor 120, or as a software module, or as a combination thereof, so that the processor 120 may operate according to the software module.

The frame buffer 410 may include various circuitry and/or executable program elements and receive and store the input image. The frame buffer 410 may provide a plurality of frames to the first interpolated frame detector 420. For example, the frame buffer 410 may provide the first frame and the second frame directly before the first frame to the first interpolated frame detector 420. Further, the frame buffer 410 may provide the plurality of frames to the second interpolated frame detector 430. For example, the frame buffer 410 may provide the second frame, which is the frame directly before the first frame, to the second interpolated frame detector 430.

The first interpolated frame detector 420 may include various circuitry and/or executable program elements and consecutively receive the plurality of frames included in the input image, and receive frames prior to the current frame of the consecutively received frames from the frame buffer 410. For example, the first interpolated frame detector 420 may receive the first frame and the second frame directly before the first time, and receive a third frame directly after the first frame through a communication interface.

The first interpolated frame detector 420 may identify whether one frame of a plurality of frames is a first interpolated frame generated based on at least two frames from the remaining frames of the plurality of frames. For example, the first interpolated frame detector 420 may identify whether the first frame is the first interpolated frame generated based on the second frame and the third frame.

The first interpolated frame detector 420 may provide identified results to the frame selector 440. For example, when 30 fps is converted to 60 fps (30 fps→60 fps), the first interpolated frame detector 420 may provide identified results in the form of DADA . . . using symbols of the original frames D and the first interpolated frame A based on temporal averaging to the frame selector 440.

In the above, only the original frame being maintained in the frame rate conversion process and the first interpolated frame being inserted additionally have been described, but some of the original frames may be removed and the first interpolated frame may be additionally inserted. For example, based on converting from 50 fps to 60 fps (50 fps→60 fps), the five-frame unit is converted to six-frames by removing one original frame and inserting two first interpolated frames.

In this example, based on three original frames each representing fn-2, fn-1, and fn, the four frames after frame rate conversion may represent gn-3, gn-2, gn-1, and gn, and based on using weighted values ($\alpha k$, $\beta k$), the four frames after frame rate conversion may each be represented as fn-2, $(\alpha_0 fn-2+\beta_0 fn-1)/(\alpha_0+\beta_0)$, $(\alpha_1 fn-1+\beta_1 fn)/(\alpha_1+\beta_1)$, and fn. For example, an equation for each of gn-3, gn-2, gn-1, and gn may be established, and may be represented as in Equation 4 below based on removing fn-1 from the four equations.

$$\beta_0(\alpha_1+\beta_1)g_{n-1}-\alpha_1(\alpha_0+\beta_0)g_{n-2}=\beta_0\beta_1 g_n-\alpha_0\alpha_1 g_{n-3} \quad \text{[Equation 4]}$$

The first interpolated frame detector 420 may obtain Equation 5 below, and identify as one of the original frames being removed based on the obtained value being less than a threshold value and two first interpolated frames being added.

$$F(g_{n-3},g_{n-2},g_{n-1},g_n)=\{\beta_0(\alpha_1+\beta_1)g_{n-1}-\alpha_1(\alpha_0+\beta_0)g_{n-2}\}-(\beta_0\beta_1 g_n-\alpha_0\alpha_1 g_{n-3}) \quad \text{[Equation 5]}$$

Here, the threshold value may be a predetermined value. The threshold value may, for example, and without limitation, be one of a minimum value, a maximum value, an average value, a median value, and a weighted sum of the previously obtained values of Equation 5. The processor 120 may adaptively identify the first interpolated frame using a threshold value of one of, for example, and without limitation, a minimum value, a maximum value, an average value, a median value, and a weighted sum of Equation 5 values during a certain time interval.

The second interpolated frame detector 430 may include various circuitry and/or executable program elements and consecutively receive a plurality of frames included in the input image and receive a frame prior to the current frame from the consecutively received frames from the frame buffer 410. For example, the second interpolated frame detector 430 may receive a second frame, which is the frame directly before the first frame, from the frame buffer 410, and receive the first frame through a communication interface.

The second interpolated frame detector 430 may identify whether one frame of a plurality of frames is the second interpolated frame generated based on one frame from the remaining frames of the plurality of frames. For example, the second interpolated frame detector 430 may identify whether the first frame is the second interpolated frame generated based on the second frame.

The second interpolated frame detector 430 may provide identified results to the frame selector 440. For example, based on forming a pattern of three original frames and two second interpolated frames by converting 24 fps to 60 fps (24 fps→60 fps), the second interpolated frame detector 430 may provide identified results in the form of DSSDSDSSDS . . . using symbols of the original frames D and the second interpolated frame S based on a repetition method to the frame selector 440.

The frame selector 440 may include various circuitry and/or executable program elements and output a plurality of original frames with the first interpolated frame and the second interpolated frame removed from the plurality of frames.

Further, the frame selector 440 may output timing information of frame interpolation. For example, the frame selector 440 may identify a frame rate of an original image that corresponds to the input image based on at least one of the first interpolated frame or the second interpolated frame, and obtain information on timing of frame interpolation based on a frame rate of the original image and an output frame rate. For example, based on the frame rate of the original image being 30 fps and the output frame rate being 60 fps, the frame selector 440 may output 1, 1.5, 2, 2.5, . . . as frame numbers. In addition, based on the frame rate of the original image being 30 fps and the output frame rate being 120 fps, the frame selector 440 may output 1, 1.25, 1.5, 1.75, . . . as frame numbers. Further, based on the frame rate of the original image being 24 fps and the output frame rate being 60 fps, the frame selector 440 may output 1, 1.4, 1.8, 2.2, 2.6, . . . as frame numbers. Further, based on the frame rate of the original image being 24 fps and the output frame rate being 120 fps, the frame selector 440 may output 1, 1.2, 1.4, 1.6, 1.8, 2, 2.2, 2.4, 2.6, 2.8, . . . as frame numbers.

Based on the original frame being removed, the frame selector 440 may multiply 1/(1+number of removed original frames) to the value of when the interval of interpolation timing is of equal interval at a position of the removed original frame so as to make the speed of the object of the original image and the output image identical. For example, based on one original frame being removed and two first interpolated frames being inserted in the process of converting form 50 fps to 60 fps (50 fps→60 fps), the first interpolated frame detector 420 may provide identified results in the form of DAADDD . . . to the frame selector 440, and the frame selector 440 may output 1, 1.42, 1.83, 2.5, 3.33, 4.17, . . . rather than 1, 1.83, 2.67, 3.5, 4.33, 5.17, . . . as frame numbers.

The frame rate conversion detector 310 using the above-described method may provide an original image including a plurality of original frames with interpolated frames removed and timing information of frame interpolation to the frame interpolator 320.

Referring back to the operation of the frame interpolator 320 in FIG. 3, the frame interpolator 320 may include various circuitry and/or executable program elements and generate frames corresponding to relevant timing information based on timing information of frame interpolation. The frame interpolator 320 may, based on a frame of relevant timing being present, use the frame of relevant timing without frame generation.

For example, the frame interpolator 320 may use technology such as motion estimation and compensation, and optical flow to perform frame interpolation.

Based on performing frame interpolation using the above-described method, the motion judder may be cancelled and an example thereof is illustrated and described in greater detail below with reference to FIG. 5A.

Figure 1B:
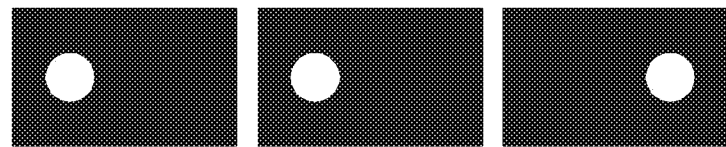
FIG. 1B is a diagram illustrating a method of improving frame rate according to conventional technology.
Figure 1C:
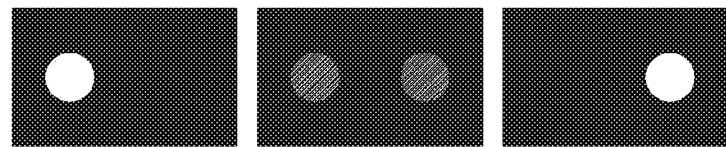
FIG. 1C is a diagram illustrating a method of improving frame rate according to conventional technology.
Figure 5A:
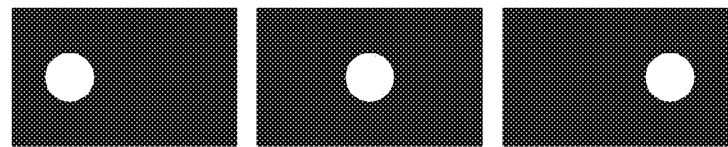
FIG. 5A is a diagram illustrating example motion judder cancelation according to an embodiment of the disclosure.

FIG. 5A is a diagram illustrating an example result of frame interpolation of an original image of FIG. 1A, and shows the result of motion judder not occurring compared to FIGS. 1B and 1C. The result is due to the frame interpolation method of FIG. 5A being different from the frame interpolation method of FIGS. 1B and 1C.

Figure 5B:
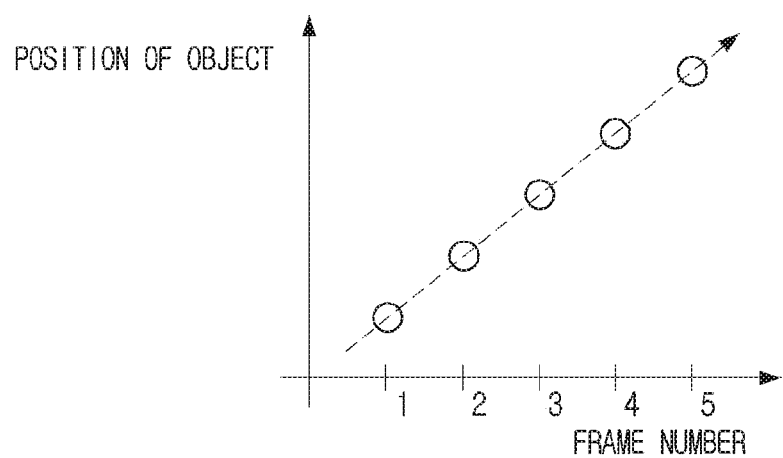
FIG. 5B is a diagram illustrating example motion judder cancelation according to an embodiment of the disclosure.

FIGS. 5B, 5C, 5D and 5E are diagrams illustrating an example shifting state of an object. FIG. 5B is based on the original image of 50 fps, and illustrates an object shifting at equal speed during the five frames.

Figure 5C:
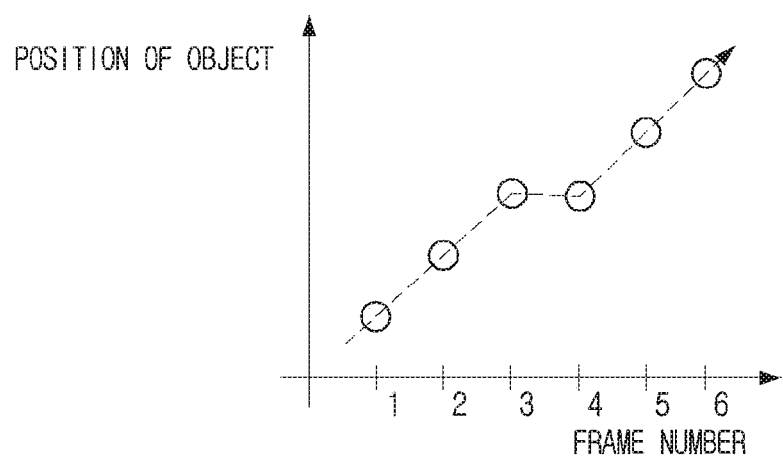
FIG. 5C is a diagram illustrating example motion judder cancelation according to an embodiment of the disclosure.

FIG. 5C illustrates the result of the second interpolated frame having been added through the method of repeating certain frames in the original image of FIG. 5B. As illustrated in FIG. 5C, a user may view the image as an object shifting at equal speed and briefly stopping at certain timing, and shifting again at equal speed.

Figure 5D:
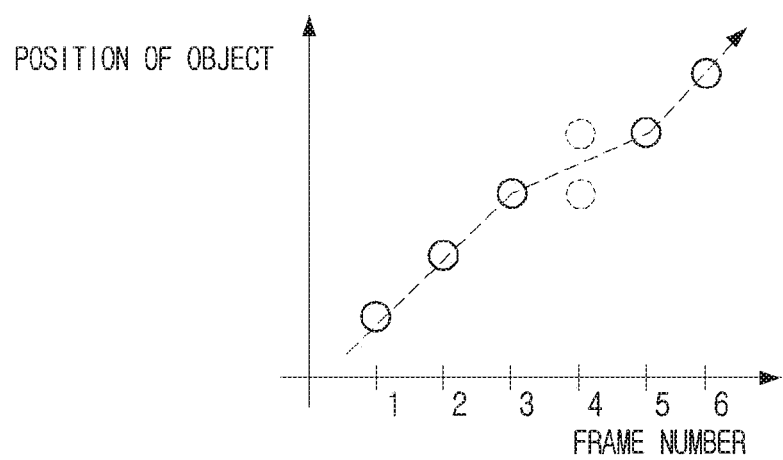
FIG. 5D is a diagram illustrating example motion judder cancelation according to an embodiment of the disclosure.

FIG. 5D illustrates the result of the first interpolated frame having been added through the method of temporal averaging in the original image of FIG. 5B. As illustrated in FIG. 5D, the user may view an object shifting at equal speed, changing to two blurred objects at certain timing, and back as one object shifting at equal speed.

Accordingly, motion judder may occur obstructing user viewing according to FIGS. 5C and 5D.

Figure 5E:
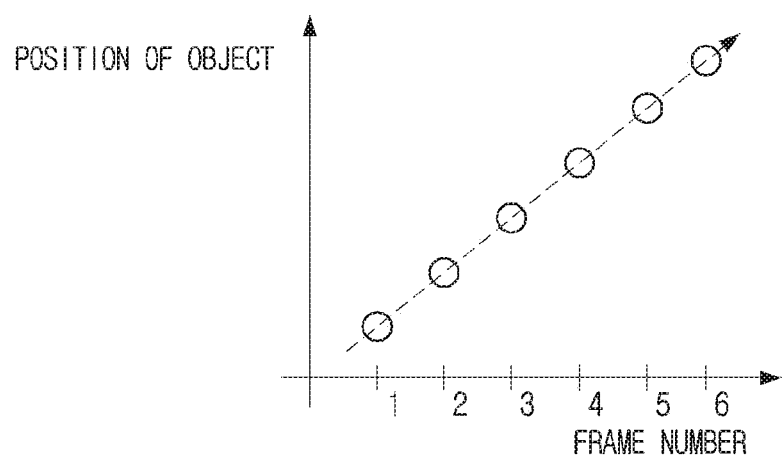
FIG. 5E is a diagram illustrating example motion judder cancelation according to an embodiment of the disclosure.

FIG. 5E illustrates identifying an interpolated frame in the interpolated image as in FIG. 5C or 5D according to the disclosure, and illustrates the results of performing interpolation again. In this example, frame interpolation is performed using technology such as, for example and without limitation, motion estimation and compensation, and optical flow, and the user may realize that motion judder has been cancelled as the user views an object shifting at equal speed.

Figure 6A:
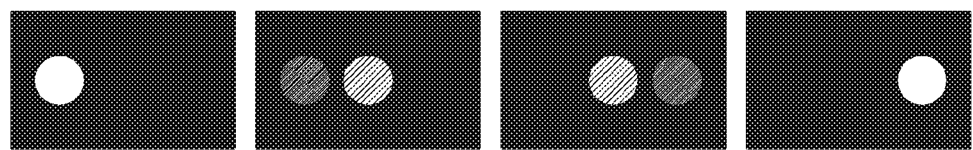
FIG. 6A is a diagram illustrating an example of an original frame being removed according to an embodiment of the disclosure.
Figure 6B:
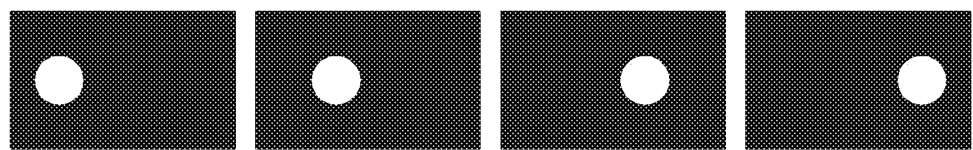
FIG. 6B is a diagram illustrating an example of an original frame being removed according to an embodiment of the disclosure.

FIGS. 6A and 6B are diagrams illustrating an example of an original frame being removed according to an embodiment of the disclosure.

FIG. 6A illustrates one original frame being removed from the original image, and shows the result of two first interpolated frame being inserted with the temporal averaging method. In this example, motion judder may be generated by identifying two blurred objects in the second frame and the third fame.

The processor 120 may identify that a second frame and a third frame is a first interpolated frame inserted through the temporal averaging method from Equation 5, and may identify that one original frame is removed.

The processor 120 may obtain timing information of frame interpolation based on identified results, and obtain an output image as in FIG. 6B by performing frame interpolation using technology such as motion estimation and compensation, and optical flow.

According to the output image as illustrated in FIG. 6B, the user may realize that motion judder has been cancelled as the user views an object shifting at equal speed.

Figure 7:
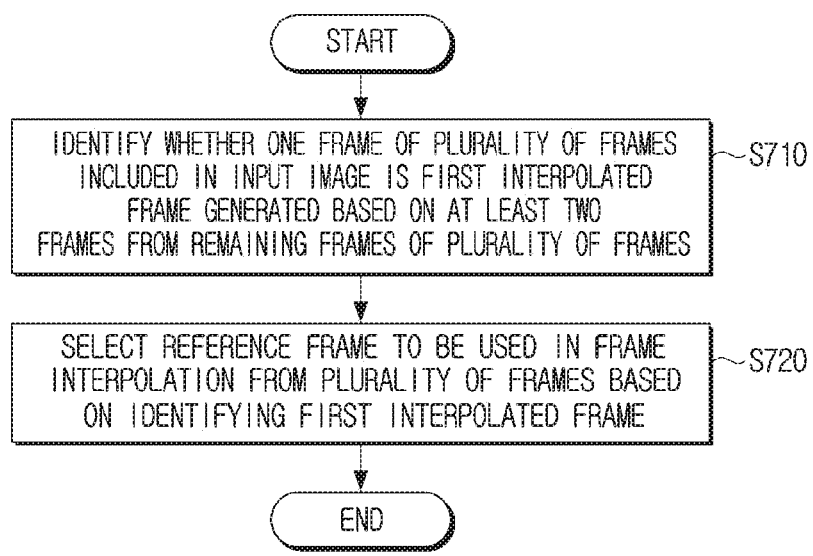
FIG. 7 is a flowchart illustrating an example method of controlling an electronic apparatus according to an embodiment of the disclosure.

FIG. 7 is a flowchart illustrating an example method of controlling an electronic apparatus according to an embodiment of the disclosure.

One frame of a plurality of frames included in the input image may be identified as to whether it is the first interpolated frame generated based on at least two frames from the remaining frames of the plurality of frames (S710). A reference frame to be used in frame interpolation of a plurality of frames may be selected based on identifying the first interpolated frame (S720).

The selecting (S720) may include identifying a plurality of original frames of a plurality of frames based on the first interpolated frame, and the control method may further include obtaining an output image by selecting the plurality of original frames as reference frames and performing frame interpolation.

The control method my further include identifying a frame rate of the original image corresponding to input image based on the first interpolated frame, and the obtaining the output image may perform frame interpolation based on the frame rate of the original image and the reference frame.

The identifying (S710) may include identifying whether the first frame of a plurality of frames is the first interpolated frame generated based on the second frame, which is the frame directly before the first frame, and the third frame, which is a frame directly after the first frame.

The identifying (S710) may include obtaining an assembled frame by assembling the second frame and the third frame, and identifying whether the first frame is the first interpolated frame based on similarity between the assembled frame and the first frame.

Obtaining the assembled frame may include obtaining an assembled frame based on one of an average between the second frame and the third frame and the weighted sum.

The identifying (S710) may include identifying the first frame as the first interpolated frame based on the sum of absolute difference (SAD) value or the sum of squared difference (SSD) value between the assembled frame and the first frame being less than the threshold value.

The identifying (S710) may include identifying whether the first frame is the first interpolated frame based on a first SAD value between the first frame and the second frame, a second SAD value between the first frame and the third frame, and a third SAD value between the second frame and the third frame.

According to the various example embodiments described above, the electronic apparatus may identify the interpolated frame inserted with the temporal averaging method in a plurality of frames included in the input image, and obtain an output image with the motion judder cancelled by performing frame interpolation on the plurality of original frames based on the identified interpolated frame.

According to an embodiment, the various example embodiments described above may be implemented as a software including instructions stored on a machine-readable storage media (e.g., computer). The machine, as an apparatus capable of calling an instruction stored in a storage medium and operating according to the called instruction, may include an electronic apparatus (e.g., electronic apparatus (A)) according to the disclosed embodiments. Based on instructions being executed by the processor, the processor may directly, or using other elements under the control of the processor, perform a function corresponding to the instruction. The instruction may include a code generated by a compiler or a code executable by an interpreter. The machine-readable storage medium may be provided in the form of a non-transitory storage medium. The 'non-transitory' storage medium may not include a signal and is tangible, but does not distinguish data being semi-permanently or temporarily stored in a storage medium.

Further, according to an embodiment, the method according to the various embodiments described above may be provided in a computer program product. The computer program product may be exchanged between a seller and a purchaser as a commodity. The computer program product may be distributed in the form of a machine-readable storage medium (e.g., compact disc read only memory (CD-ROM)) or distributed online through an application store (e.g., PlayStore™). In the case of on-line distribution, at least a portion of the computer program product may be at least temporarily stored in a storage medium such as a manufacturer's server, a server of an application store, or a memory of a relay server, or temporarily generated.

In addition, according to an embodiment, the various embodiments described above may be implemented in a recordable medium which is readable by a computer or an apparatus similar to a computer using software, hardware, or the combination of software and hardware. In some cases, the embodiments described herein may be implemented by the processor itself. Based on a software implementation, the embodiments such as the procedures and functions described herein may be implemented with separate software modules. Each of the software modules may perform one or more functions and operations described herein.

The computer instructions for performing the processing operations of apparatuses according to the various embodiments described above may be stored in a non-transitory computer-readable medium. The computer instructions stored in this non-transitory computer-readable medium cause the specific apparatus to perform the processing operations in the apparatus according to the above-described various embodiments when executed by the processor of the specific apparatus. The non-transitory computer readable medium may refer, for example, to a medium that stores data semi-permanently, and is readable by an apparatus. Examples of the non-transitory computer readable medium include a compact disc (CD), a digital versatile disc (DVD), a hard disc, a Blu-ray disc, a universal serial bus (USB), a memory card, a read only memory (ROM), and the like.

In addition, each of the elements (e.g., a module or a program) according to the various embodiments described above may include a single entity or a plurality of entities, and some sub-elements of the abovementioned sub-elements may be omitted, or another sub-element may be further included in various embodiments. Alternatively or additionally, some elements (e.g., modules or programs) may be integrated into one entity to perform the same or similar functions performed by each respective element prior to integration. The operations performed by a module, a program, or other element, in accordance with the various embodiments, may be performed consecutively, in a parallel, repetitively, or in a heuristically manner, or at least some operations may be performed in a different order, omitted, or may further include a different operation.

While various example embodiments of the disclosure have been illustrated and described with reference to various drawings, the disclosure is not limited to specific embodiments or drawings described herein, and it will be understood by those of ordinary skill in the art that various changes in form and details may be made therein without departing from the spirit and scope of the disclosure, including the appended claims and their equivalents.

What is claimed is:

1. An electronic apparatus comprising:
a memory configured to store an input image;
display; and
a processor configured to control the display to display the input image,
wherein the processor is further configured to:
identify a first frame from among a plurality of frames included in the input image as a first interpolated frame based on comparing the first frame to a frame assembled using frames of the plurality of frames,
obtain an output image by re-interpolating the first interpolated frame based on at least two frames of the plurality of frames included in the input image, and
control the display to display the output image;
identify a plurality of original frames excluding the first interpolated frame from among the plurality of frames, and
re-interpolate the first interpolated frame based on the plurality of original frames.

2. The electronic apparatus of claim 1, wherein the processor is further configured to:
identify a frame rate of an original image corresponding to the input image based on the first interpolated frame, and
re-interpolate the first interpolated frame based on the plurality of original frames and the frame rate of the original image.

3. The electronic apparatus of claim 1, wherein the processor is further configured to:
identify a frame rate of an original image corresponding to the input image based on the first interpolated frame,
obtain information on timing of frame interpolation based on the frame rate of the original image,
obtain motion information from the plurality of original frames based on the information on timing of frame interpolation, and re-interpolate the first interpolated frame based on the obtained motion information.

4. The electronic apparatus of claim 3, wherein the processor is further configured to obtain the information on timing of frame interpolation based on the frame rate of the original image and an output frame rate.

5. The electronic apparatus of claim 1, wherein the processor is configured to identify whether the first frame of the plurality of frames is the first interpolated frame generated based on a second frame, the second frame being a frame directly before the first frame, and a third frame, the third frame being a frame directly after the first frame.

6. The electronic apparatus of claim 5, wherein the assembled frame is obtained by assembling the second frame and the third frame and the processor is configured to:
identify whether the first frame is the first interpolated frame based on a similarity between the assembled frame and the first frame.

7. The electronic apparatus of claim 6, wherein the processor is configured to obtain the assembled frame based on one of an average of the second frame and the third frame and a weighted sum of the second frame and the third frame.

8. The electronic apparatus of claim 6, wherein the processor is configured to identify the first frame as the first interpolated frame based on a sum of absolute difference (SAD) value or a sum of squared difference (SSD) value between the assembled frame and the first frame being less than a threshold value.

9. The electronic apparatus of claim 1, wherein the processor is configured to:
identify whether one frame of the plurality of frames is a second interpolated frame inserted by repeating another frame from the plurality of frames, and
obtain the output image by further re-interpolating the second interpolated frame.

10. An method of controlling an electronic apparatus, the method comprising:
identifying a first frame from among a plurality of frames included in an input image as a first interpolated frame based on comparing the first frame to a frame assembled using frames of the plurality of frames,
obtaining an output image by re-interpolating the first interpolated frame based on at least two frames of the plurality of frames included in the input image, and
displaying the output image,
wherein the method further comprises:
identifying a plurality of original frames excluding the first interpolated frame from among the plurality of frames, and
wherein the obtaining an output image comprises re-interpolating the first interpolated frame based on the plurality of original frames.

11. The method of claim 10, the method further comprising:
identifying a frame rate of an original image corresponding to the input image based on the first interpolated frame, and wherein the obtaining an output image comprises re-interpolating the first interpolated frame based on the plurality of original frames and the frame rate of the original image.

12. The method of claim 10, the method further comprising:
identifying a frame rate of an original image corresponding to the input image based on the first interpolated frame;
obtaining information on timing of frame interpolation based on the frame rate of the original image;
obtaining motion information from the plurality of original frames based on the information on timing of frame interpolation; and
wherein the obtaining an output image comprises re-interpolating the first interpolated frame based on the obtained motion information.

13. The method of claim 12, wherein the obtaining information on timing of frame interpolation comprises obtaining the information on timing of frame interpolation based on the frame rate of the original image and an output frame rate.

14. The method of claim 10, the method further comprising:
identifying whether the first frame of the plurality of frames is the first interpolated frame generated based on a second frame, the second frame being a frame directly before the first frame, and a third frame, the third frame being a frame directly after the first frame.

15. The method of claim 14, wherein:
the assembled frame is obtained by assembling the second frame and the third frame, and
the identifying comprises identifying whether the first frame is the first interpolated frame based on a similarity between the assembled frame and the first frame.

16. The method of claim 15, wherein the obtaining an assembled frame comprises obtaining the assembled frame based on one of an average of the second frame and the third frame and a weighted sum of the second frame and the third frame.

17. The method of claim 15, wherein the identifying comprises identifying the first frame as the first interpolated frame based on a sum of absolute difference (SAD) value or a sum of squared difference (SSD) value between the assembled frame and the first frame being less than a threshold value.

18. The method of claim 10, the method further comprising:
identifying whether one frame of the plurality of frames is a second interpolated frame inserted by repeating another frame from the plurality of frames, and wherein the obtaining an output image comprises obtaining the output image by further re-interpolating the second interpolated frame.

* * * * *